United States Patent
Tsirkin (10) Patent No.: US 11,537,429 B2
(45) Date of Patent: Dec. 27, 2022

(54) SUB-IDLE THREAD PRIORITY CLASS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 111 days.

(21) Appl. No.: 16/721,154

(22) Filed: Dec. 19, 2019

(65) Prior Publication Data

US 2021/0191757 A1    Jun. 24, 2021

(51) Int. Cl.
| | | |
|---|---|---|
| G06F 9/48 | (2006.01) | |
| G06F 8/41 | (2018.01) | |
| G06F 9/46 | (2006.01) | |

(52) U.S. Cl.
CPC .......... *G06F 9/4881* (2013.01); *G06F 9/48* (2013.01); *G06F 9/4887* (2013.01); *G06F 8/4441* (2013.01); *G06F 9/461* (2013.01)

(58) Field of Classification Search
CPC .... G06F 9/4881; G06F 9/5033; G06F 9/5038; G06F 11/3612; G06F 9/45516; G06F 9/4887; G06F 9/50; G06F 11/3423
See application file for complete search history.

(56) References Cited

U.S. PATENT DOCUMENTS

| | | | | |
|---|---|---|---|---|
| 7,165,252 | B1* | 1/2007 | Xu | G06F 9/4887 718/100 |
| 7,421,592 | B1* | 9/2008 | Kadatch | G06F 11/3423 713/300 |
| 10,108,453 | B2 | 10/2018 | Accapadi et al. | |
| 2002/0032719 | A1* | 3/2002 | Thomas | G06F 9/45516 718/107 |
| 2003/0018691 | A1* | 1/2003 | Bono | G06F 9/5033 718/106 |
| 2003/0061260 | A1 | 3/2003 | Rajkumar | |
| 2007/0094648 | A1* | 4/2007 | Post | G06F 9/45516 717/140 |
| 2009/0031022 | A1* | 1/2009 | Wexler | H04L 43/0858 709/224 |
| 2010/0083261 | A1* | 4/2010 | Jayamohan | G06F 9/461 718/102 |

(Continued)

FOREIGN PATENT DOCUMENTS

| | | |
|---|---|---|
| CN | 106095536 B | 6/2019 |
| EP | 1685486 A2 | 8/2006 |

(Continued)

OTHER PUBLICATIONS

Colea, Paul et al. "Generalizing loop-invariant code motion in a real-world compiler." (2015). (Year: 2015).*

(Continued)

*Primary Examiner* — Qing Yuan Wu
(74) *Attorney, Agent, or Firm* — Lowenstein Sandler LLP (57) ABSTRACT

Implementations for scheduling a sub-idle thread priority class are described. An example method may include assigning, by a scheduler of a computer system, a sub-idle execution priority class to a code optimization thread; responsive to determining that a central processing unit has been idle for at least a threshold period of time, running the code optimization thread; and generating, by the code optimization thread, an optimized code of a program executable by the computer system. The method may further execute the optimized code.

17 Claims, 5 Drawing Sheets

(56) References Cited

U.S. PATENT DOCUMENTS

| | | | | |
|---|---|---|---|---|
| 2011/0035752 | A1* | 2/2011 | Krishnakumar | G06F 9/4881 |
| | | | | 718/103 |
| 2014/0282587 | A1* | 9/2014 | Argon | G06F 9/5027 |
| | | | | 718/104 |
| 2017/0185407 | A1* | 6/2017 | Shwartsman | G06F 9/30145 |
| 2017/0315806 | A1* | 11/2017 | Mazumdar | G06F 9/30094 |
| 2020/0073709 | A1* | 3/2020 | Zhang | G06F 9/5027 |

FOREIGN PATENT DOCUMENTS

| | | |
|---|---|---|
| EP | 3364296 A1 | 8/2018 |
| WO | 2019005860 A1 | 1/2019 |

OTHER PUBLICATIONS

"Scheduling Aperiodic and Sporadic Jobs in Priority-Driven Systems", Real Time Systems, downloaded from https://aits-tpt.edu.in/wp-content/uploads/2018/08/RTS-Unit-4.pdf on Oct. 30, 2019, 18 pages.

* cited by examiner

SUB-IDLE THREAD PRIORITY CLASS

TECHNICAL FIELD

The disclosure is generally related to computing systems, and more particularly, to scheduling a sub-idle thread priority class in a central processing unit.

BACKGROUND

Computing devices such as computers, tablet computers, and smart phones may include one or more processors that each may further include one more computing cores. To reduce processing time and fully utilize the computing power of the processors, an operating system for the computing device may concurrently execute multiple applications and multiple threads of instructions within each applications. A thread is a unit of execution that has executable code which may run on a central processing unit (CPU). The operating system schedules threads on the available computing cores using a scheduler. The scheduler is responsible for keeping the CPU busy.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for scheduling a sub-idle thread priority class. A computer's operating system may use a scheduler to schedule execution of threads on one or more processors. A scheduler may implement a number of scheduling policies, which determine, e.g., when and for how long a thread runs on a particular processors. Threads may represent independent paths of execution for components of a computer program. If multiple threads need to be executed by the same set of processors, such that the number of threads exceeds the number of processors, then one or more of the threads may be waiting while another thread executes. In some scheduling policies, each thread is assigned a priority value. Threads that have higher priority are scheduled to run first, followed by threads with lower priority. If no threads are ready to run, the CPU may be in an idle state.

Scheduling policies may be divided into two major categories: realtime thread class policies and normal thread class policies. Threads scheduled to run in the realtime scheduling class, typically used for time-critical threads that must completed without interruptions, may be scheduled first. These threads may be executed in a first-in-first-out policy, in which each thread is assigned a fixed priority level. The highest priority thread that is ready to run will be scheduled to run first. This thread will run until it is blocked, exits, or is preempted by a higher priority thread that is ready to run. Alternatively, realtime threads may run in a round-robin policy. Each thread in the round-robin policy may also be assigned a fixed priority, but threads with the same priority level are scheduled round-robin style within a certain time slice.

Threads scheduled to run in the normal scheduling class may be scheduled to run after all realtime threads have run. Normal scheduling policy may use the completely fair scheduler to provide fair access period for all threads using this policy. The completely fair scheduler may establish a dynamic priority list, which may be based on the characteristics of the thread and on the number of runnable threads contending for a processor.

In many scheduling policies, lower priority threads may be given some share of the CPU even when higher priority threads are ready to run in order to ensure that all threads get the chance to run. However, switching between threads, or context switching, uses memory and other resources, and may cause latency in the programs running on the CPU. Some threads may have such a low priority that it is not worth interrupting the higher priority threads to execute them. For example, it may not be worth interrupting a higher priority thread in order to run a thread that is only useful for code optimization. The benefits of running these lowest priority threads is not worth the overhead cost of switching between threads.

However, current scheduling policies do not have a way to schedule these lowest priority threads without potentially interrupting the higher priority threads. Even threads that are scheduled to run when the CPU is idle may create latency in the higher priority threads. For example, a higher priority thread may pause while it waits for an event to occur. While the thread is paused, even if just for a very brief time, the CPU is considered idle and a low priority thread may run. While the low priority thread is running, the high priority thread may become ready to run again (e.g., the event that the high priority thread was waiting for has occurred). Both preempting the low priority thread or waiting for the low priority thread to yield would result in latency in the high priority thread. Hence, running low priority threads as soon as the CPU is idle may not be desirable, as it may cause latency in the higher priority threads.

This may be especially important in microservice environments, in which multiple high priority threads may be sending and receiving messages to each other. Microservices may be processes, such as pieces of software instruction code, which compute responses for client requests. For example, a client may send a request and a microservice may respond to that request. If a CPU switches to a lower priority thread (e.g., an idle class priority thread) while a high priority microservice is waiting for a message, then switching back to the high priority microservice once the message is received may create latency. Taking the time to switch between threads may not be worth the benefit received from running the lowest priority thread, such as a code optimizing thread.

Some programming language compilers optimize code at start-up time. The resulting optimized programs may demonstrate high efficiency, however, they may have high start-up times caused by the code optimization stage. Other compilers may produce executable programs that start up quickly, while the code is optimized concurrently to running the program. This type of optimization may enable a low start-up time, however the executable program may demonstrate lower efficiency while it is running un-optimized code. Furthermore, switching the running program to the optimized code may create latency. Optimizing code while a program is running and then patching the code may create significant stalls.

Aspects of the present disclosure address the above-noted and other deficiencies by introducing the sub-idle priority class which may be used for scheduling the lowest priority threads, such as code optimization threads. The sub-idle thread priority class may be scheduled to run only after the CPU has been idle for a certain amount of time. In one implementation, a scheduler of a computer system assigns a sub-idle execution priority class to a code optimization thread. After determining that the central processing unit (CPU) has been idle for at least a threshold period of time, the scheduler may run the code optimization thread which may generate optimized code of a program executable by the computer system. The code optimization thread may result in more efficient code that executes more rapidly and consumes fewer resources when executed. The code optimization thread may remove redundant code without changing the output and side effects of the non-optimized code. For example, the code optimization thread may bring loop-invariant calculations out of the loop in order to execute the calculation only once, rather than with each iteration of the loop; identify expressions that can be evaluated at compile time and replace them with their values; replace inefficient operations with equivalent, more efficient, operations; and eliminate dead code (i.e., a section of code that is never executed or is unreachable). The computer system may then switch execution to the newly optimized code.

The systems and methods described herein include technology that enhances utilization of computing resources, such as processor usage, for a computer system. For example, aspects of the present disclosure may provide for optimizing code while also providing both high startup times and fast response times. More particularly, aspects of the present disclosure may allow for fast startup times by delaying code optimization, as well as fast execution times by switching to newly optimized code during runtime. Furthermore, aspects of the present disclosure provide technology that enhances the efficiency and/or performance of a computing system by reducing latency and jitter associated with context switching. In particular, latency and jitter are reduced because execution of the sub-idle thread is delayed until the CPU has been idle for a threshold period of time before running the code optimization thread, making a quick wakeup and sudden context switch unlikely.

Various aspects of the above referenced methods and systems are described in details herein below by way of examples, rather than by way of limitation.

Figure 1:
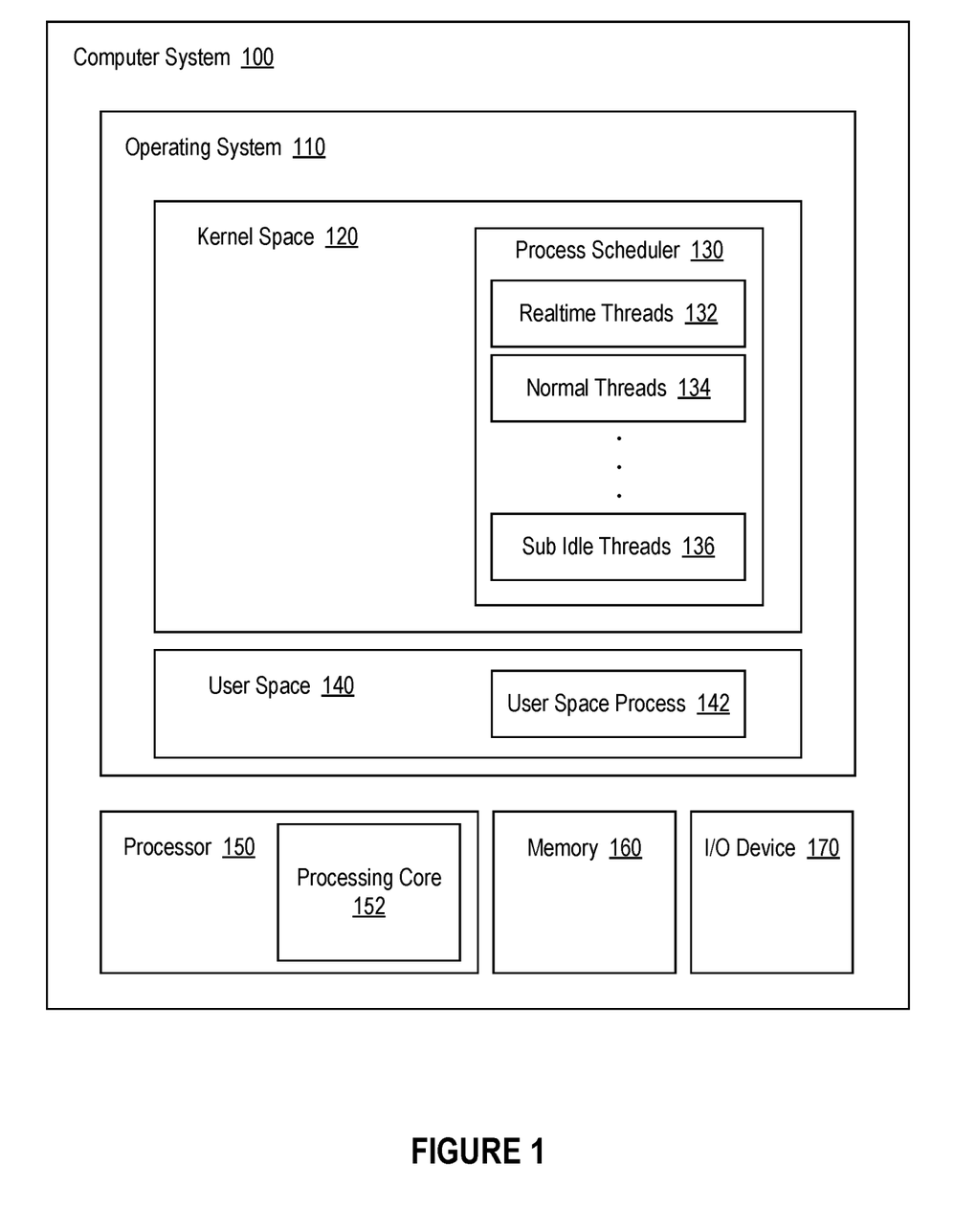
FIG. 1 depicts a high-level component diagram of an example computer system architecture, in accordance with one or more aspects of the disclosure.

FIG. 1 depicts a high-level component diagram of an illustrative example of computer system 100, in accordance with one or more aspects of the present disclosure. The computer system 100 may comprise an operation system 110, a processor 150, a memory 160, and an I/O device 170. Operating system 110 may comprise a process scheduler 130 running within a kernel space 120. Operating system 110 may further comprise a user space process 142 running within a user space 140. Processor 150 may refer to a device capable of executing instructions encoding arithmetic, logical, or I/O operations. Processor 150 may be a single core processor which is typically capable of executing one instruction at a time (or process a single pipeline of instructions), or a multi-core processor which may simultaneously execute multiple instructions or multiple threads. Processor 150 may also be referred to as a central processing unit (CPU). Processor 150 may include one or more processing cores 152. Memory 160 may refer to a volatile or non-volatile memory device, such as RAM, ROM, EEPROM, or any other device capable of storing data. Memory 160 may serve as the primary storage area of computer system 100, and may hold data that are being used by applications and processes running on processor 150. I/O device 170 may refer to devices capable of inputting and/or outputting binary data. In some implementations, the computer system 100 may comprise a plurality of I/O devices and a plurality of memory devices.

Operating system 110 may be software that controls hardware resources and basic functions of the computer system such as scheduling, memory management, executing applications, and so on. In order to run a program or application, operating system 110 may create a process for running that program or application. Each process may consist of one or more execution contexts, or threads. A thread relates to the operations for performing one or more tasks of a process. During operation, a thread may be waiting for a resource or for an event. For example, a thread for a graphical user interface process may be waiting for input from a user. The thread is wakened once the event has occurred.

In one example, operating system 110 comprises a user space 140 and a kernel space 120. The kernel space 120 may execute processes fundamental to the operating system such as system calls, memory management, process scheduling, device drivers, and so on. User space 140 may contain all programs that run outside the kernel space 120.

The process scheduler 130 may assign waiting threads to run on the processor 150. The process scheduler 130 may handle threads, processes, and data flows by assigning, or scheduling, them to processors, network links, or other resources to handle the tasks. In one example, process scheduler 130 may schedule threads according to various priority classes. Process scheduler 130 may assign the highest priority threads to realtime threads 132 class. Lower priority threads may be assigned to normal threads 134 class. The lowest priority threads may be assigned to the sub-idle threads 136 priority class. The process scheduler 130 may execute each thread priority class on processing core 152. In alternative examples, process scheduler 130 may execute threads on more than one processing core.

In one implementation, the process scheduler 130 may monitor the processing core 152 and execute the sub-idle thread 136 priority class only after the processing core 152 has been idle for at least a threshold period of time. The threshold period of time may be a pre-determined system-wide parameter. Alternatively, the process scheduler 130 may determine the threshold period of time. In one implementation, the process scheduler 130 may determine that the threshold period of time must be equal to or exceed the amount of time needed for the higher priority thread to receive a response after sending a request. The process scheduler 130 may keep track of the amount of time it takes for the higher priority thread(s) to receive a response after sending a request, and set the threshold period of time in view of the average amount of time it takes to receive a response. By basing the threshold period of time on the average expected time the higher priority threads wait to receive a response, the process scheduler 130 may avoid executing the sub-idle thread priority class when the higher priority thread is simply awaiting a response from a recent request. Because the process scheduler 130 waits until the high priority thread is idle for a long time, this method may avoid the high overhead cost associated with context switching. In the code optimization example, the low priority thread that is optimizing code performs computationally intensive modifications to the code. If the higher priority thread is ready soon after the code optimizing thread begins, switching back from the lower priority thread to the high priority thread will create latency in the high priority thread. In practice it may be difficult to make the low priority thread atomic and safe to be interrupted at any point, so the low priority thread may require locks to prevent the high priority thread from running while the low priority (e.g., code optimizing) is executing. These locks make the latency even worse for the high priority thread. Therefore, it is important that the process scheduler 130 waits for the higher priority thread to be idle long enough to avoid a sudden context switch. In some implementations, a sub-idle thread may specify its own threshold that exceeds the system-wide parameter, effectively further lowering its own priority.

The process scheduler 130 may use an UMWAIT instruction in order to determine that the CPU has been idle for the threshold period of time. An UMWAIT instruction may be used in conjunction with a UMONITOR instruction. The UMWAIT instruction directs the processor to wait while monitoring a range of addresses defined in the UMONITOR instruction. The thread executing the UMWAIT instruction wakes up either when there has been a change to the range of addresses defined in the UMONITOR instruction, or when the UMWAIT time-stamp counter reaches or exceeds the threshold period of time. Once the UMWAIT counter reaches or exceeds the threshold period of time, indicating that the processor has been idle for at least the threshold period of time, the process scheduler 130 may execute the sub-idle thread priority 136 class.

Figure 2:
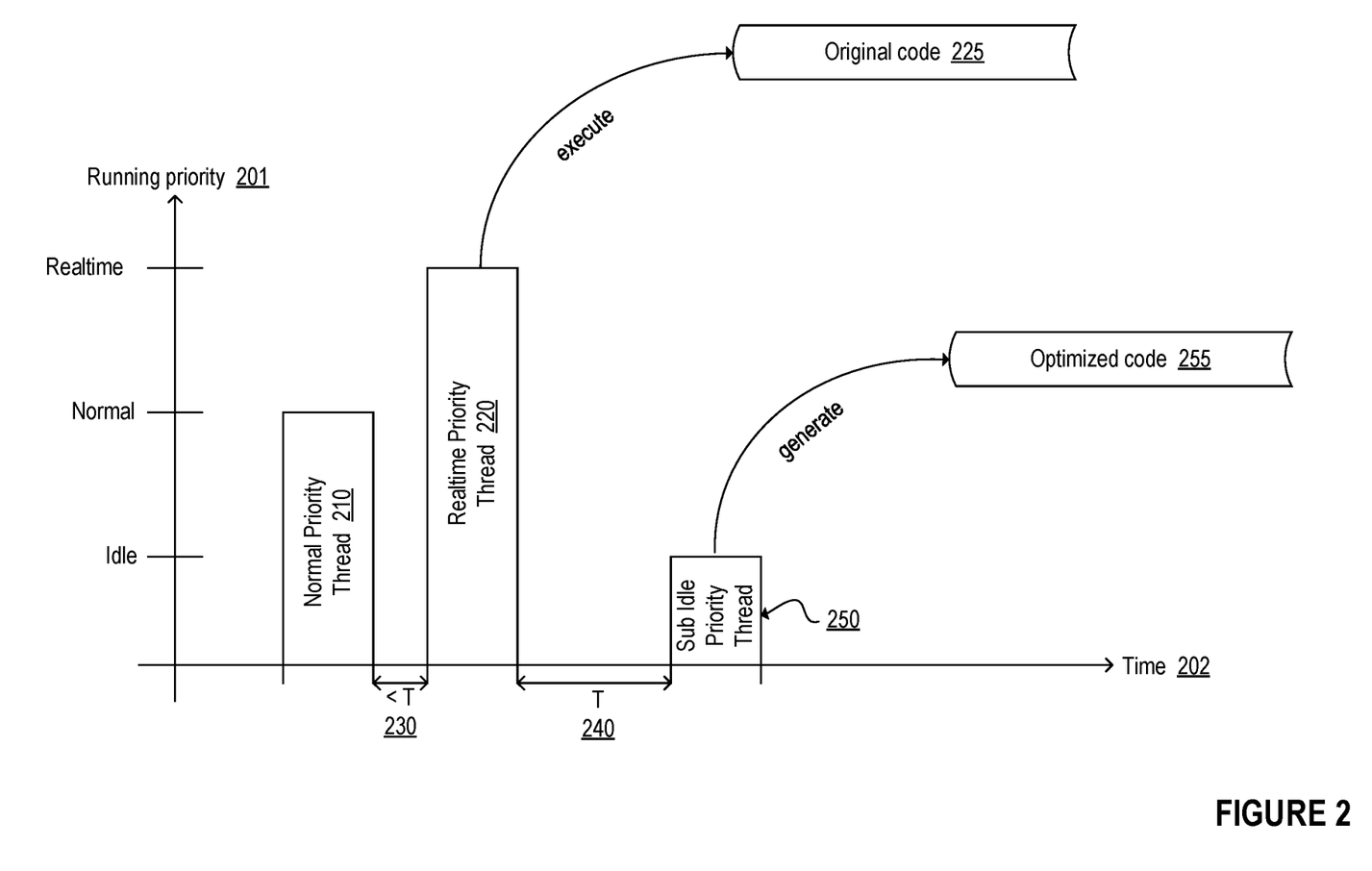
FIG. 2 illustrates an execution of a scheduling policy on a central processing unit, in accordance with one or more aspects of the disclosure.

FIG. 2 illustrates an execution of a scheduling policy on a CPU, according to one or more aspects of the disclosure. The y-axis of the bar graph represents the running priority 201, and the x-axis represents time 202. In this exemplary illustration, the first thread that is ready to run is classified as a normal priority thread 210. After the normal priority thread completes, the CPU is idle for an amount of time less than T (230). T may represent the threshold period of time described above. Then a realtime priority thread 220 is ready to run. The realtime priority thread 220 may execute the original code 225 of a computer program.

After the realtime priority thread yields the execution control, the CPU is idle for an amount of time equal to T (240). This may indicate that the higher priority thread is in a paused state and may not wake up immediately. As described above, T may represent the amount of time it takes for the realtime priority thread to receive a response after sending a request. In one example, this may be the amount of time it takes for a message to propagate through the microservice pipeline. Once the scheduler has determined that the CPU has been idle for at least T amount of time, it may run the sub-idle priority thread 250. The sub-idle priority thread 250 may generate optimized code 255 for the same computer program executed by realtime priority thread 220. The CPU may then switch the running program to the newly optimized code with minimal latency.

Figure 3:
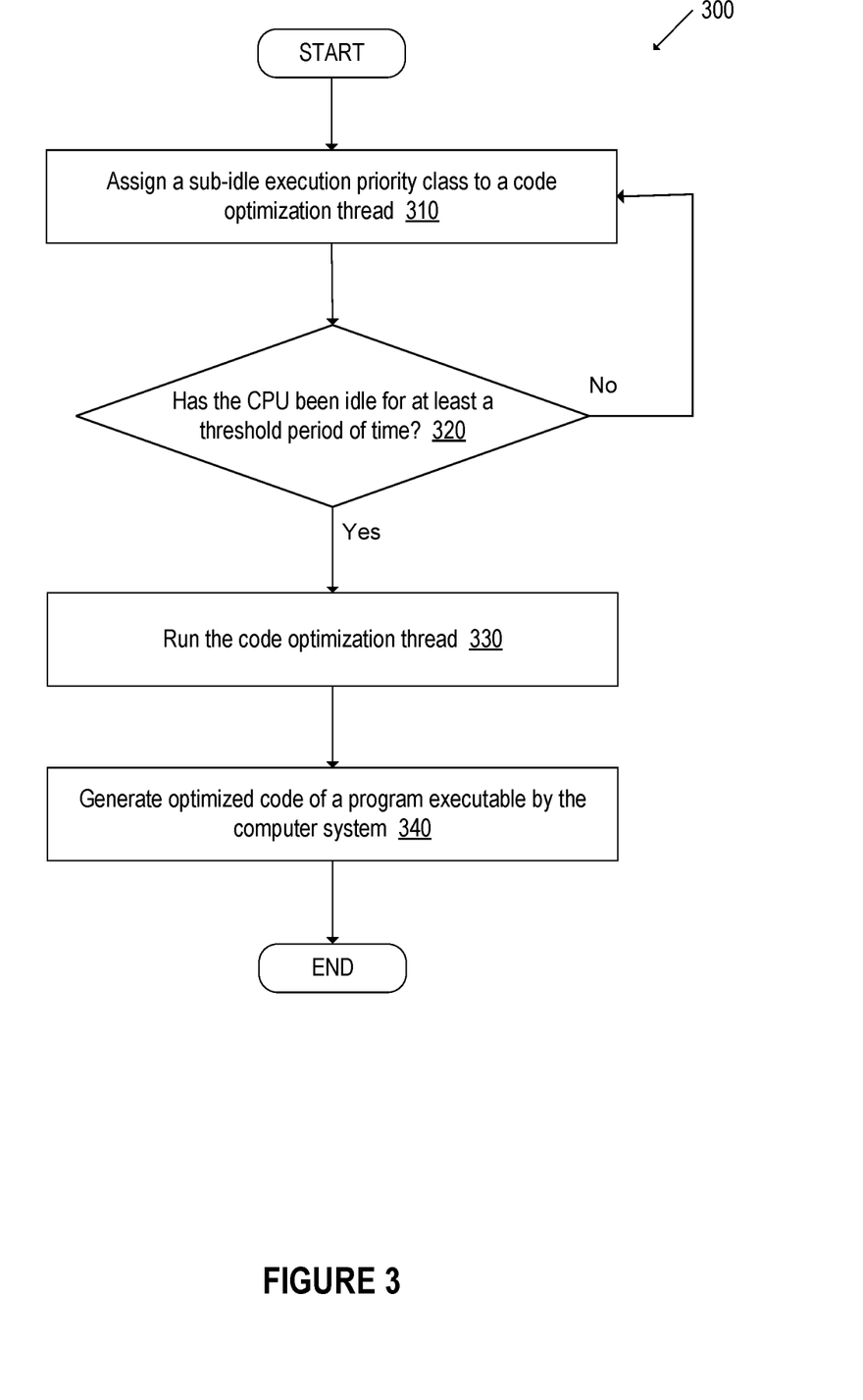
FIG. 3 depicts a process flow diagram for an illustrative example method for assigning and executing a sub-idle thread priority class, in accordance with one or more aspects of the disclosure.

FIG. 3 depicts a process flow diagram for an illustrative example of method 300 for assigning and executing a sub-idle thread priority class, in accordance with one or more aspects of the disclosure. Method 300 may be performed by processing devices that may comprise hardware (e.g., circuitry, dedicated logic, programmable logic, microcode, etc.), executable code (such as is run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 300 may be performed by process scheduler 130 as shown in FIG. 1.

Referring to FIG. 3, method 300 may be performed by processing devices of a server device or a client device and may begin at block 310. At block 310, a processing device may assign a sub-idle execution priority class to a code optimization thread. At block 320, the processing device may determine whether the CPU has been idle for at least a threshold period of time. If not, the process returns to block 310. If the CPU has been idle for at least a threshold period of time, the method moves to block 330 and the processing device may execute the code optimization thread. At block 340, the processing device may generate optimized code of a program executable by the computer system.

Figure 4:
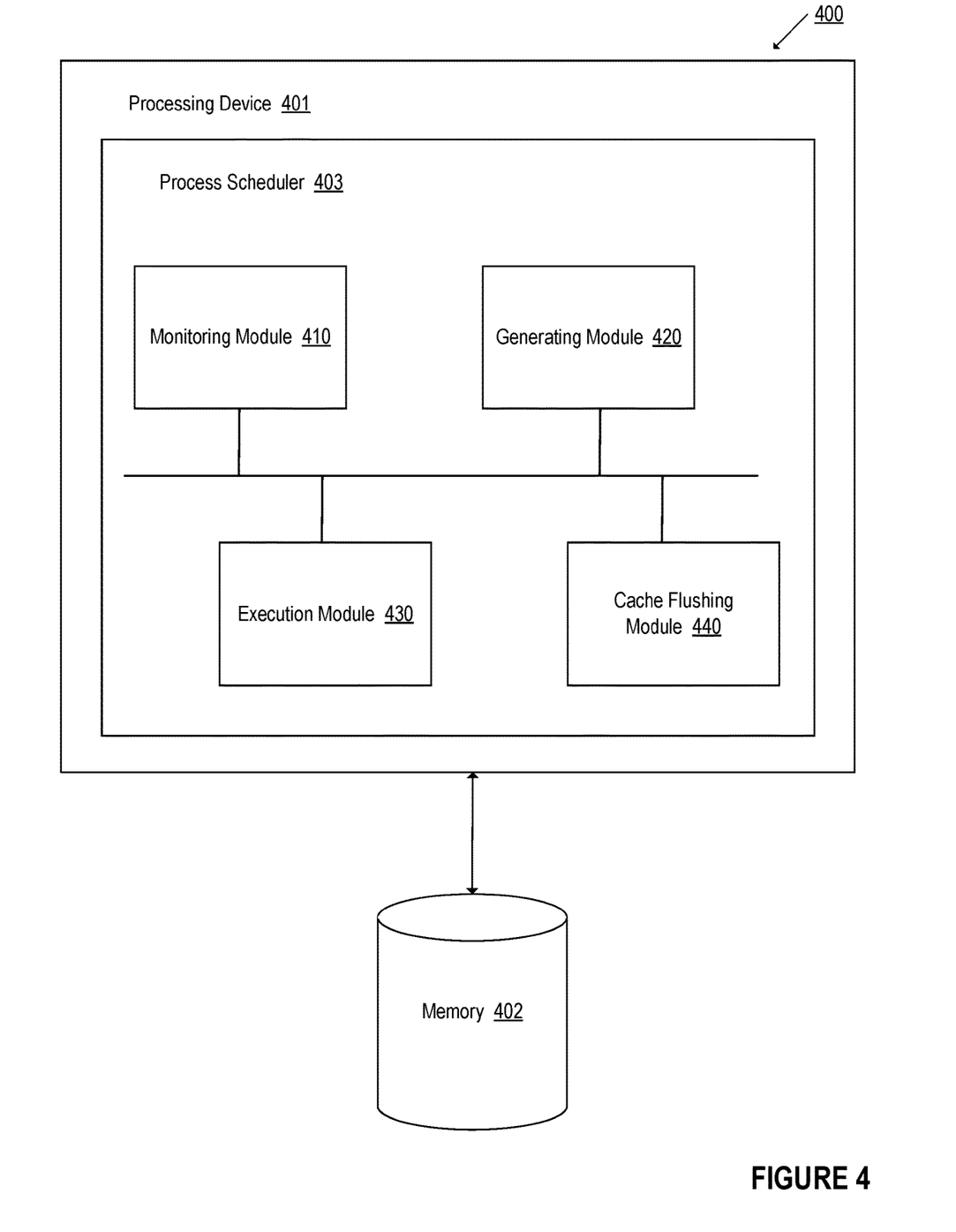
FIG. 4 depicts a block diagram of an example computer system in accordance with one or more aspects of the disclosure.

FIG. 4 depicts a block diagram of an example computer system 400 operating in accordance with one or more aspects of the disclosure. Computer system 400 may perform the same functions as computer system 100 of FIG. 1, and may include one or more processing devices 401 and one or more memory devices 402. In the example shown, the processing device 401 of computer system 400 may include a process scheduler 403. Process scheduler 403 may perform the same functions as process scheduler 130 described with respect to FIG. 1. The process scheduler 403 may be running within the kernel space of the processing device 401, as shown in FIG. 1.

Process scheduler 403 may include a monitoring module 410, a generating module 420, an execution module 430, and a cache flushing module 440. The monitoring module 410 may enable the processing device 401 to monitor the state of the CPU by monitoring the processes running on the CPU. If the CPU is idle, the monitoring module 410 may enable the processing device 401 to determine how long the CPU has been in an idle state, and whether the CPU has been idle for at least a threshold period of time. In one implementation, the monitoring module 410 may enable the kernel of processing device 401 to execute UMONITOR/UMWAIT instructions in order to determine that the CPU has been idle for at least a threshold period of time.

The threshold period of time may be determined by the amount of time it takes to receive a response after sending a request. The monitoring module 410 may enable the processing device 401 to keep track of the amount of time it takes for higher priority threads (either those in the realtime or normal thread priority classes, for example) to receive a response after sending a request. The monitoring module 410 may then enable the processing device 401 to determine an average amount of time it takes to receive a response, and set that as the threshold amount of time. In an alternative embodiment, the monitoring module 410 may set the threshold amount of time to another amount of time.

Once the monitoring module 410 has determined that the CPU has been idle for at least the threshold period of time, the generating module 420 may enable the processing device 401 to run the one or more sub-idle priority class threads. In one example, the sub-idle priority thread may be a code optimization thread. In this example, the generating module 420 may enable the processing device 401 to run the code optimization thread, which will generate the optimized code for a higher priority program that is paused on the CPU.

The execution module 430 may enable the processing device 401 to execute the output from the generating module 420. For example, the execution module 430 may enable the processing device 401 to transfer execution of the higher priority program running on the CPU from the originally executed code to the newly optimized code generated from the sub-idle priority thread.

The cache flushing module 440 may enable the processing device 401 to flush the CPU code cache, for example, by writing the CPU code cache to memory 402. Flushing the CPU code cache may ensure that the changes implemented by the previous modules are accessible to every level of the memory hierarchy. For example, once the processing device 401 begins executing the newly optimized code, cache flushing module 440 ensures that the process device 401 will not revert back to the older version of the executable code.

Figure 5:
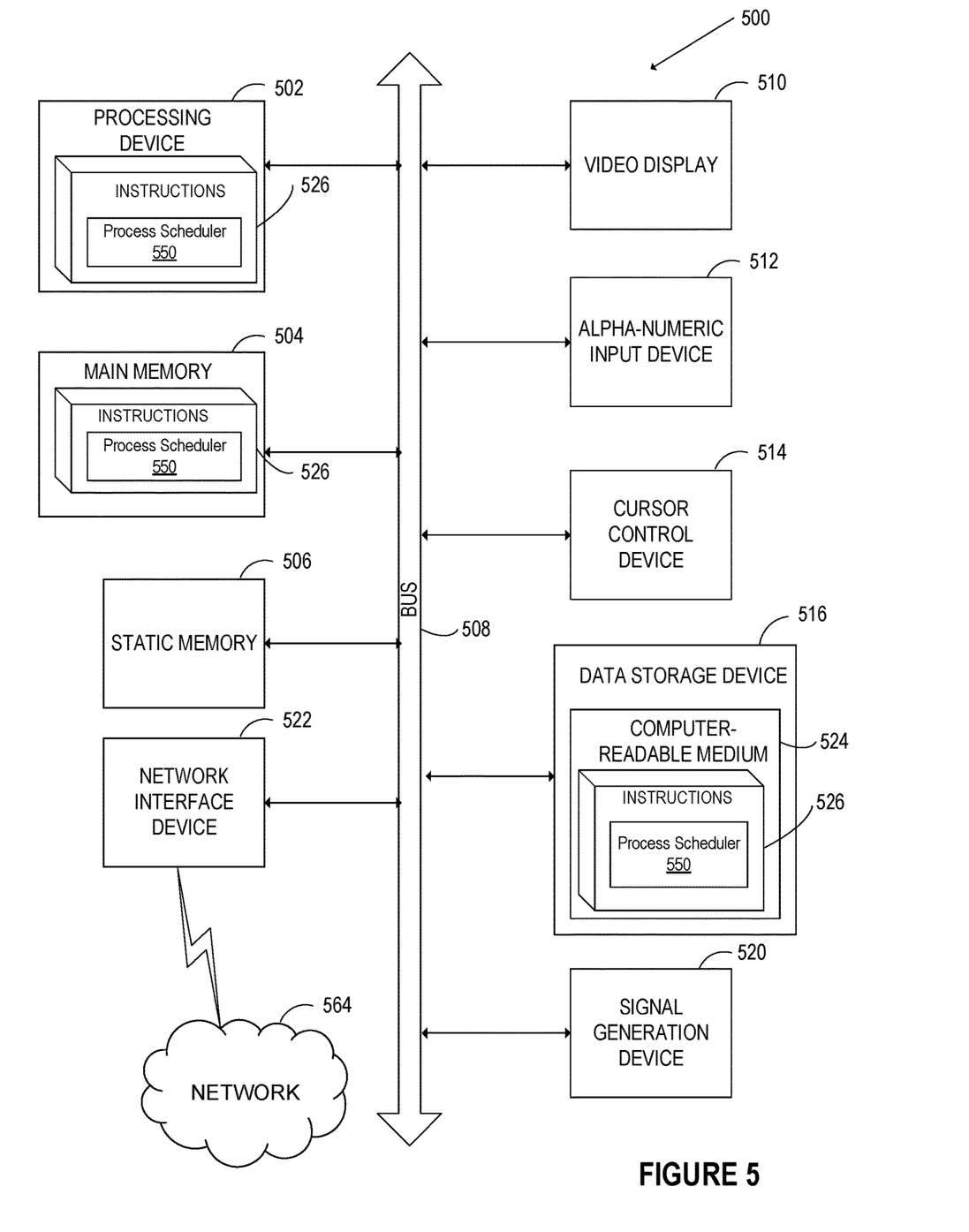
FIG. 5 depicts a block diagram of an illustrative computing device operating in accordance with the examples of the disclosure.

FIG. 5 depicts a block diagram of an illustrative computing device operating in accordance with one or more aspects of the disclosure. In various illustrative examples, computer system 500 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor). The processing device 502 is configured to execute processing logic (e.g., instructions 526) that includes process scheduler 550 for performing the operations and steps discussed herein (e.g., corresponding to the method of FIG. 3, etc.).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 300 for process scheduler 550 (which may implement the functions of process scheduler 130 of FIG. 1) and the modules illustrated in FIGS. 1 and 4.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation. Furthermore, "requestor" and "initiator" are used interchangeably throughout this disclosure.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   assigning, by a scheduler of a computer system, a sub-idle execution priority class to a code optimization thread associated with a program;
   executing, by the computer system, the program;
   determining an average period of time for receiving responses to requests sent by threads assigned to a priority class higher than the sub-idle execution priority class;
   responsive to determining that a central processing unit (CPU) has been idle for at least the average period of time, running the code optimization thread assigned to the sub-idle execution priority class; and
   generating, by the code optimization thread, an optimized code of a portion of the program while executing the program.

2. The method of claim 1, further comprising:
   executing, by the computer system, the optimized code.

3. The method of claim 1, wherein determining that the CPU has been idle for at least the average period of time comprises:
   monitoring, by the scheduler, a memory location associated with the CPU for the average period of time; and
   determining that the memory location has not been accessed for at least the average period of time.

4. The method of claim 1, further comprising:
   flushing a code cache associated with the CPU to a main memory associated with the computer system.

5. The method of claim 1, wherein generating the optimized code of the portion of the program further comprises at least one of:
   bringing a loop-invariant calculation out of a loop;
   evaluating an expression at compile time; or
   eliminating an unreachable section of code.

6. The method of claim 1, further comprising:
   running un-optimized code of the program before initializing the code optimization thread.

7. A system comprising:
   a memory; and
   a processing device communicatively coupled to the memory to:
   assign, by a scheduler of a computer system, a sub-idle execution priority class to a code optimization thread associated with a program;
   execute, by the computer system, the program;
   determine an average period of time for receiving response to requests sent by threads assigned to a priority class higher than the sub-idle execution priority class;
   responsive to determining that a central processing unit (CPU) has been idle for at least the average period of time, run the code optimization thread assigned to the sub-idle execution priority class; and
   generate, by the code optimization thread, an optimized code of a portion of the program while executing the program.

8. The system of claim 7, wherein the processing device is further to:
   execute, by the computer system, the optimized code.

9. The system of claim 7, wherein the processing device to determine that the CPU has been idle for at least the average period of time comprises the processing device to:
   monitor, by the scheduler, a memory location associated with the CPU for the average period of time; and
   determine that the memory location has not been accessed for at least the average period of time.

10. The system of claim 7, wherein the processing device is further to:
    flush a code cache associated with the CPU to a main memory associated with the computer system.

11. The system of claim 7, wherein the processing device to generate the optimized code of the portion of the program further comprises the processing device to perform at least one of:
    bring a loop-invariant calculation out of a loop;
    evaluate an expression at compile time; or
    eliminate an unreachable section of code.

12. The system of claim 7, wherein the processing device is further to:

run un-optimized code of the program before initializing the code optimization thread.

13. A non-transitory computer readable storage medium including instructions that, when executed by a processing device, cause the processing device to perform a method comprising:

assigning, by a scheduler of a computer system, a sub-idle execution priority class to a code optimization thread associated with a program;

executing, by the computer system, the program;

determining an average period of time for receiving responses to requests sent by threads assigned to a priority class higher than the sub-idle execution priority class;

responsive to determining that a central processing unit (CPU) has been idle for at least the average period of time, running the code optimization thread assigned to the sub-idle execution priority class; and generating, by the code optimization thread, an optimized code of a portion of the program while executing the program.

14. The non-transitory computer readable storage medium of claim 13, wherein the processing device is further to:
execute, by the computer system, the optimized code.

15. The non-transitory computer readable storage medium of claim 13, wherein determining that the CPU has been idle for at least the average period of time comprises:

monitoring, by the scheduler, a memory location associated with the CPU for the average period of time; and determining that the memory location has not been accessed for at least the average period of time.

16. The non-transitory computer readable storage medium of claim 13, further comprising:

flushing a code cache associated with the CPU to a main memory associated with the computer system.

17. The non-transitory computer readable storage medium of claim 13, wherein generating the optimized code of the portion of the program further comprises at least one of:

bringing a loop-invariant calculation out of a loop;
evaluating an expression at compile time; or
eliminating an unreachable section of code.

* * * * *